United States Patent Office 3,376,271
Patented Apr. 2, 1968

3,376,271
POLYESTER RESINS AND METHOD
OF MAKING SAME
John E. Masters and Darrell D. Hicks, Louisville, Ky., assignors to Celanese Coatings Company, a corporation of Delaware
No Drawing. Continuation-in-part of application Ser. No. 415,782, Dec. 3, 1964. This application Sept. 20, 1965, Ser. No. 488,726
The portion of the term of the patent subsequent to May 14, 1980, has been disclaimed
11 Claims. (Cl. 260—78.4)

This application is a continuation-in-part of my continuation-in-part and copending applications Ser. Nos. 415,782 and 415,194, filed Dec. 3, 1964, and Dec. 1, 1964, respectively, which are continuations-in-part of my application Ser. No. 80,973, filed Jan. 6, 1963 all of the above applications are now abandoned. This latter application is a division of my application Ser. No. 594,716, filed June 29, 1956, now Patent No. 3,089,863.

The invention relates to new synthetic resins of the polyester type. In one of its aspects the invention pertains to a new class of branched chain polyester thermoplastic resins. In another of its aspects the invention provides a process for preparing novel polyesters of extremely high molecular weight having utility in the textile field. In accordance with still another of its aspects the invention provides a method for the preparation of unsaturated polyesters which can be cured by known methods to produce useful potting, casting, molding and laminating compositions.

Conventionally, polyesters are formed by condensing dibasic acids or their anhydrides with polyhydric alcohols under esterification conditions, that is, conditions whereby there is a liberation of water. By these known processes, when the functionalities of the acid and of the alcohol do not exceed two, thermoplastic resins result. These resins, however, are not multi-branched chain compositions. Branched chain, thermoplastic resins can be made by the use of compounds having functionalities greater than two, if these compounds are used in small proportions. However, when reactants having functionalities greater than two are used, functional groups are free to react with each other. Under reaction conditions generally employed, functional groups tend to react with each other to form three dimensional or cross-linked structures, making it very difficult to produce thermoplastic non-cross-linked resins having a plurality of branch chains. It is also difficult, if not impossible, to make high molecular weight thermoplastic polyesters. To form thermoplastic resins from polyfunctional reactants, the product generally must be modified by monofunctional chain stoppers to prevent functional groups from forming three dimensional structures. Hence, highly branched chain, non-cross-linked polyesters of high molecular weight are virtually unknown.

In accordance with this invention, however, branched chain, thermoplastic polyester resins having extremely high molecular weights can be prepared. By this invention, a new class of polyester polymers is provided, each polyester having a multiplicity of linear non-cross-linked polyester branch chains.

In the practice of this invention, rather than reacting a polycarboxylic acid solely with a polyfunctional alcohol, difunctional polymer-forming reactants are combined in the presence of a polyfunctional nucleus-forming compound. The difunctional polymer-forming reactants are dibasic acid anhydrides and monoepoxides. A dibasic acid anhydride and a monoepoxide, if pure, will not react. A dibasic acid anhydride will, however, react with an alcoholic hydroxyl group even at relatively low temperatures to form the half-ester. A monoepoxide, on the other hand, reacts more readily at low temperatures with carboxyl groups than with hydroxyl groups. Both the reaction between an anhydride and a hydroxyl, and the reaction between a monoepoxide and a carboxyl take place at a temperature below a normal esterification temperature. Since anhydrides and monoepoxides will not react with each other, it is necessary to initiate the reaction with a group reactive with the monoepoxide to form a hydroxyl group which in turn will react with the anhydride; or an initiator which will react with the anhydride to form the half-ester thus providing a carboxyl group for reaction with the monoepoxide. Or the initiator may be reactive with both an anhydride and a monoepoxide.

These novel products of this invention are formulated by reacting together the initiator having at least three functional constituents which comprise of carboxyl radicals, phenolic radicals, or combinations thereof, or combinations thereof with alcoholic hydroxyl radicals, in the presence of a dibasic anhydride and monoepoxide. Depending upon the initiator used, the reaction takes place alternately with the dibasic anhydride and the monoepoxide to form the thermoplastic branch chain polyesters. It is understood that this invention may contemplate the production of first a polymer or copolymer of the initiator and then reacting the polymer or copolymer with alternately either the dibasic anhydride and the monoepoxide, or vice versa, to formulate branch chains of a monomer or polymer nature onto the polymer or copolymer chain, depending upon the proportions of the monoepoxide or dibasic anhydride utilized.

When the monoepoxide and the dibasic acid anhydride are reacted with a phenol, the reaction takes place between the phenolic hydroxyl group and the monoepoxide to form an ether as illustrated in Equation A using a trihydric phenol and propylene oxide as an example:

(A) 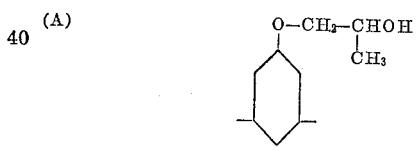

the phenolic group is acidic and the reaction between an acid anhydride and the phenolic group can be reached with difficulty but when the epoxide group is also present, this readily reacts first with the hydroxyl group to produce the type of structure illustrated in Equation A. The acid anhydride will then react with the alcoholic hydroxyl group produced in the side chain by reason of the reaction between the phenol and the monoepoxide to form an ester linkage as illustrated in Equation B:

(B) 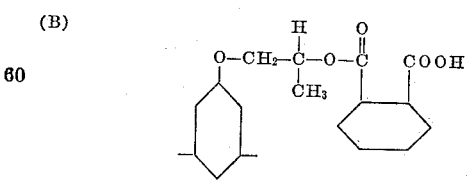

If the phenol is trihydric and the reaction is carried out with three mols of the monoepoxide and three mols of the anhydride, the polyester produced will have terminal carboxylic acid groups as shown in Equation B. The use of excess monoepoxide will result in one or more side chains being terminated by an alcoholic hydroxyl group as illustrated in Equation C:

(C) 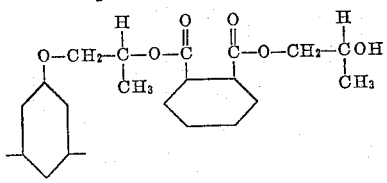

Thus, if six mols of monoepoxide are used with three mols of an anhydride with a trihydric phenol, all three side chains will terminate with alcoholic hydroxyl groups.

The molar ratio of the monoepoxide and anhydride to the functionality of the phenol can be varied quite widely producing polyester side chains having as many as 100 or more recurring units.

The same reaction would take place with polyhydric phenols containing three or more phenolic hydroxyl groups such as contained in the conventional Novolak resins. The length of the polyester side chain will depend somewhat upon the molecular weight of the starting polyhydric phenol. The only determining factor on the length of the polyester side chain would be gelation.

When the monoepoxide and the dibasic anhydride are reacted with a monomer or a polymer having carboxyl radicals, the reaction proceeds in a very similar fashion to that illustrated above with respect to the reaction of phenol with a monoepoxide and a dibasic anhydride. That is, the reaction proceeds first between the carboxyl functional groups of the carboxyl radicals and the monoepoxide. Using as an example propylene oxide and a carboxyl compound being the reaction product of vinyl toluene and acrylic acid, a reaction would take place resulting in the product illustrated in Equation D:

(D) 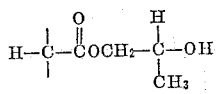

The hydroxyl groups of the resulting product then readily react with the dibasic anhydride, as for example phthalic anhydride, to form the polyester linkage as illustrated in Equation E:

(E) 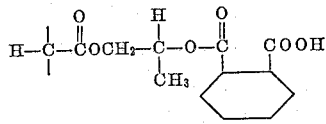

It must also be understood that if an equal mol ratio of monoepoxide and dibasic anhydride is used, the resulting polyester will have terminal carboxyl groups. However, if an excess monoepoxide is used, the product will result having terminal hydroxyl groups as evidenced by equation F:

(F) 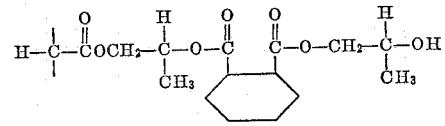

On the other hand, if the dibasic anhydride is used in excess, the product will have terminating carboxyl groups.

When the monoepoxide and the dibasic anhydride are reacted with a monomer or polymer having terminal alcoholic hydroxyl groups, the reaction produced first forms an ester. Since the alcoholic hydroxyl terminating groups do not react readily with a monoepoxide, but do react with the carboxyl groups of the dibasic anhydride, as for example phthalic anhydride, the resulting product would appear as illustrated in Equation G:

(G) 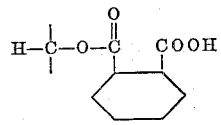

The carboxyl groups of the product illustrated in equation (G) then react with a monoepoxide such a propylene oxide, to form the product illustrated in Equation H:

(H) 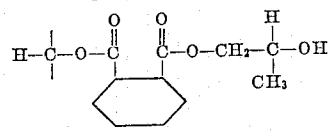

If the polymeric resulting substance, containing at least three or more alcoholic hydroxyl groups, is reacted with an equal mol ratio of monoepoxide and dibasic anhydride, the resulting branched chain polyester will have at least three terminal groups in the form of hydroxy groups. However, depending upon what reacting material is used in excess, either carboxyl or alcoholic hydroxyl groups may appear in the terminating positions.

For the purpose of producing coating compounds, we prefer to have alternate epoxide and anhydride units or moieties of at least three present in one product.

The maximum number of units of epoxides or anhydrides which can be present in a compound will vary widely and depend greatly upon the amount of initiator used. However, the maximum number of units will be that which will produce a product which is thermoplastic. It is, of course, to be understood that the length of the polyester side chain will be determined by gelation.

With respect to an acrylic compound, wherein the compound carries a backbone which is an acrylic polymer or copolymer, it is again preferred to have at least three to five epoxide or anhydride units, or combinations thereof, present.

Thus, it can be seen that anhydride and monoepoxide monomers add alternately to the initiator, forming branch chains. The initiator is a compound which will react with a monoepoxide and/or a dibasic acid anhydride to form either hydroxyl groups for reaction with anhydride or carboxyl groups for reaction with monoepoxide, in other words a compound containing active hydrogens. It is noted that the terminal groups of the molecule cannot react with each other or with terminal groups of other resin molecules. The terminal groups of the molecule can only react with unreacted epoxide or anhydride, depending upon whether or not the termnial group is a hydroxyl or carboxyl group. If an excess of either monoepoxide or of dibasic acid anhydride is used, the molecule will terminate. A hydroxyl terminated compound is formed if the monoepoxide is in excess and a carboxyl terminated compound is formed if the anhydride is in excess. If equimolecular quantities of dibasic acid anhydride and monoepoxide are used the molecule will contain both carboxyl and hydroxyl terminal groups. Since the monoepoxide and dibasic acid anhydride do not readily react with each other, and since either or both must first react with a third compound, it is seen that this compound functions as a reaction center from which branches emanate by alternate monomeric additions of dibasic acid anhydride and monoepoxide. The initiator thus functions as a reaction center from which a number of linear polyester, polymeric chains emanate, the number of chains being equal to the functionality of the initator.

Among the new products contemplated by the invention included are monomers, polymers or copolymers having at least three carboxyl or phenolic groups, or combinations thereof, or combinations with alcoholic hydroxyl groups in which at least three of the terminal hydrogen atoms of said groups are replaced by a radical of the following structural formulae:

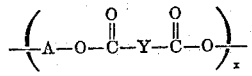

or

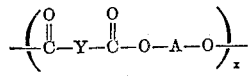

or combinations thereof, where (a)

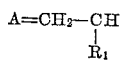

where $R_1$=H, an alkyl radical, an alkenyl radical,

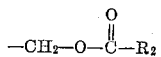

or —$CH_2$—O—$R_2$ where $R_2$=an alkyl, alkenyl or aryl radical, (b) Y=nucleus of a dibasic acid anhydride and (c) x=at least 1.

In accordance with an embodiment of this invention, therefore, dicarboxylic acid anhydrides and monoepoxides are utilized as polymer-forming reactants, the reaction being initiated by an initiator, to which the polymer-forming reactants are joined to form branch chains. As the initator, it is desirable to employ polyfunctional compounds containing active hydrogens whereby said initiator is capable of reacting with an epoxide or an anhydride or both. In other words, the initiator will be an acid, an alcohol, or a phenol, each having a functionality of at least three, or a polyfunctional compound such as a copolymer, an ester or an ether having carboxyl-substituents, and/or phenolic hydroxyl or alcoholic hydroxyl substituents.

Examples of such initiators containing phenol groups are trihydric phenols such as phloroglucinol, 1,2,4-trihydroxybenzene, 1,2,3-trihydroxybenzene and tetra (hydroxyphenyl) alkanes or Novolak resins which are the reaction products of aldehydes and phenols (including phenol, substituted phenol, resorcinol, etc.).

Examples of polybasic acids which act as initiators are trimellitic acid, tricarballylic acid, aconitic acid, trimesic acid and pyromellitic acid. Other carboxyl containing initiators may include resin-maleic or fumaric adducts, and maleinized or fumarized oils.

Also included are polymers and copolymers containing a large number of carboxyl groups, for example vinyl carboxylic acid polymers and copolymers such as the copolymers of vinyl toluene and acrylic acid, or copolymers of vinyl acetate and crotonic acid, acrylic acid, methylacrylic acid, itaconic acid, maleic acid, fumaric acid, etc. These copolymers have as many as 100 carboxyl groups per linear chain and from such copolymers a wide variety of novel resinous compositions can be prepared having branch chains equal to the number of carboxyl groups per linear chain of the copolymer.

The carboxy copolymers can be formed by free radical polymerization of an unsaturated carboxylic acid including acrylic, methacrylic and crotonic acid, half-ester of maleic acid, etc., with another monoethylenically unsaturated monomer polymerizable therewith.

Examples of monoethylenically unsaturated monomer which can be polymerized with the unsaturated carboxylic acids include acrylonitrile, methacrylonitrile, acrylic and methacrylic acids, their esters, amides and salts, itaconic acid and its functional derivatives, particularly its esters, maleic anhydride or maleic and fumaric acids and their esters, vinyl esters and esters, vinyl sulfides, styrene, vinyl toluene, and allyl esters of monocarboxylic acids. Specific vinylidene compounds are methyl, ethyl, isopropyl, butyl, tert-butyl, octyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, tert-butylaminoethyl acrylate or methacrylate, acrylamide, methacrylamide, N-methacrylamide, N-butylmethacrylamide, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, vinylidene chloride, vinyl chloride, methylolacrylamide, β-hydroxyethyl acrylate, isobutylene, α-methylstyrene, p-methylstyrene, p-chlorostyrene, vinylnaphthalene, etc., which may be used.

Polyfunctional alcohols having at least three alcoholic hydroxyl groups, for example, erythritol, pentaerythritol, castor oil and polypentaerythritol, e.g., dipentaerythritol, tripentaerythritol, trimethylolethane, trimethylolpropane, sorbitol, mannitol, arabitol, adonitol, xylitol, persitol, ricinoleic esters and partial esters of the above listed polyols, allyl alcohol copolymers such as copolymers of styrene and allyl alcohol, polyvinyl alcohol, defunctionalized polyepoxide (the reaction of 4 (n) epichlorohydrin, 5(n+1) diphenols and 2 ethylene chlorohydrins), polyepoxide resins partially esterified with monobasic acids leaving three or more hydroxyl groups, polymers and copolymers of hydroxyalkyl esters of polymerizable acids such as hydroxyethyl acrylate, hydroxypropyl methacrylate, hydroxybutyl crotonate, hydroxypropyl maleate, dihydroxy-propyl fumarate, etc., and tripentaerythritol may also be used as initiators along with allyl alcohol polymers and copolymers.

This invention also contemplates initiators having phenolic hydroxyl and alcoholic hydroxyl groups, for example, partial hydroxy-alkylated phenols such as the reaction products of one or two mols of ethylene oxide, propylene oxide, butylene oxide, or styrene oxide reacted with phloroglucinol, Novolak resins partially etherified with monoepoxides or monochlorohydrins or a bisphenol terminated bisphenol-epihalohydrin condensate can be used which is prepared by reacting, in aqueous medium, n mols of the epihalohydrin with n+1 mols of bisphenol using n mols of an alkali (plus 10 percent molar excess), for example, sodium, potassium, or calcium hydroxide. This reaction is usually carried out by adding the halohydrin to the mixture of bisphenol, alkali, and water at about 50° C., raising the temperature to 100° C. The polymer thus formed is subsequently washed after neutralizing the water medium with HCl or $H_3PO_4$. The product is a linear polyether polymer terminated with bisphenol and containing intermediate alcoholic hydroxyl groups. The terminal hydroxyl groups, i.e., those attached to the terminal bisphenol groups, are phenolic hydroxyls.

Another group of initiators within the contemplation of this invention includes compounds having both carboxyl and alcoholic hydroxyl substituents, for example the hydroxy-carboxy copolymers disclosed in my copending application Ser. No. 364,274, filed May 1, 1964. Further, some of the carboxyl groups, but not all, of a vinyl toluene-acrylic acid copolymer can be reacted with a monoepoxide to form a carboxy-hydroxy initiator. Other alcoholic hydroxyl and carboxyl-containing initiators may be maleinized and fumarized epoxy esters containing hydroxyl groups, epoxy resins terminated with polybasic acids, alkyd resins, glyceric acid, gluconic acid, maleic acid, tartronic acid, tartaric acid, resorcylic acid, citric acid, and dimethylol propionic acid. Further, there is contemplated by this invention polymeric substances having alcoholic hydroxyl and acid containing groups such as hydroxy-carboxy copolymers of arabitol and trimellitic acid, epoxide resins partially esterified with unsaturated fatty acids and further reacted with maleic or fumaric acid.

Still another group of initiators within the contemplation of this invention cludes carboxyl-containing and phenolic hydroxyl-containing compounds such as diphenolic acid, resorcylic acid, orsellinic acid, gallic acid and pyrogallol carboxylic acid. Also, bisphenol terminated bisphenol-epihalohydrin condensates made as set forth hereinbefore by reacting n moles of epihalohydrin with n+1 mols of bisphenol in the presence of n mols of sodium hydroxide (plus 10 percent molar excess) can be partially esterified with a dicarboxylic acid or anhydride to produce a compound containing phenolic hydroxyl radicals, carboxyl radicals, and, if desired, alcoholic hydroxyl radicals. Other bisphenol-epihalohydrin condensates are also contemplated, for example, a polyhydroxy polyether condensate of bisphenol, epichlorohydrin, and ethylene chlorohydrin, containing six alcoholic hydroxyl groups.

Other examples of initiators having carboxyl, alcoholic, hydroxyl and phenol groups may be the reaction product of diphenolic acid and an epoxide or the reaction product of a dibasic acid with an epoxide resin having terminating phenol groups, such as mono(hydroxyethyl)ether of diphenolic acid and mono(hydroxypropyl)ether of diphenolic acid, and epoxide resins terminated with polyphenols partially reacted with an hydrides or dibasic acids.

It is to be understood that the term polymer used herein may include copolymers and interpolymers.

In the preparation of the polyester resins of this invention the three reactants are combined and reacted under such conditions that no formation of water takes place during the reaction. In other words, the reaction is conducted under sufficiently mild conditions, for example, a temperature sufficient to bring about the carboxyl-epoxide reaction, yet not sufficiently high to bring about a carboxylhydroxyl, or esterification, reaction which would result in the formation of water, generally a temperature not exceeding 150° C. Desirably the initiator, and the dibasic acid anhydride are combined and the monoepoxide is slowly added thereto. By this method the temperature can more readily be controlled, since in most instances the reaction is exothermic, especially during its early stages. The temperature desirably is maintained in the range of 115° C. to 130° C.

As the polyester is formed there is a progressive reduction in acid number. In some instances, it is desirable to employ catalysts in the formation of branch chained polyesters. The selection of such catalysts may be from those already well known and suitable for this purpose and include tertiary amines or those epoxy-carboxy catalysts as described in U.S. Patent 3,002,959 and any other catalysts as disclosed in application Ser. No. 458,409, filed May 24, 1965.

Monoepoxides within the contemplation of this invention are epoxy compounds having three-membered epoxide rings and free of other reactive groups, particularly groups capable of reacting with an acid anhydride. Included is oxirane, or ethylene oxide, as well as the alkyl oxiranes, for example, methyl oxirane or propylene oxide, butene-2-oxide, etc. Among others are ethers and esters containing only one three-membered epoxide substituent, each free of other groups capable of reacting with an acid anhydride. Examples are phenyl glycidyl ether, isopropyl glycidyl ether, glycidyl benzoate, butyl glycidyl ether, allyl glycidyl ether, glycidyl acrylate, a glycidyl methacrylate, glycidyl crotonate, glycidyl acetate, etc. With reference to unsaturated monoepoxide, some degree of selection must be exercised. For instance, the use, in the practice of this invention, of an unsaturated monoepoxide with an unsaturated dibasic acid anhydride results in the formation of cross-linked thermosetting compositions. Since cured compositions result, the use of an unsaturated monoepoxide in conjunction with an unsaturated dibasic acid anhydride is not suggested in making thermoplastic acid anhydride is not suggested in making thermoplastic resins according to this invention. In other words, a monoepoxide containing a double bond such as allyl glycidyl ether, or glycidyl acrylate, desirably is not employed with an unsaturated acid anhydride, such as maleic acid anhydride. It is preferred to employ an unsaturated acid anhydride with a saturated monoepoxide.

Dicarboxylic acid anhydrides applicable to this invention include both aliphatic and aromatic dicarboxylic acid anhydrides, either saturated or unsaturated, for example, succinic, adipic, maleic, glutaric, phthalic, isosuccinic, and sebacic anhydrides, naphthalene dicarboxylic acid anhydrides, etc. Endocisbicyclo - (2,2,1) - 5 - heptene-2,3-dicarboxylic anhydride (sold under the trademark "Nacid" anhydride) and 1,4,5,6,7,7-hexachlorobicyclo-(2,2,1)-5-heptene-2,3-dicarboxylic anhydride (sold under the trademark "Chlorendic" anhydride) are also desirable.

One of the advantages of this invention is that highly branched chain thermoplastic polyesters are prepared following the invention. If a highly functional initiator is used according to the invention dibasic acid anhydride and monoepoxide add alternately through each reactive group to produce highly branched chain compounds. These branch chains do not cross-link as in conventional processes because in this process esterification conditions are not employed. In prior processes now in use end groups react due to esterification. In accordance with this invention monomers add to the initiator to form branch chains without the formation of water. For example, if a compound having twelve or fifteen carboxyl or alcoholic hydroxyl radicals is used as an initiator a polyester will be formed having twelve or fifteen branch chains since the initiator becomes the nucleus from which the branch chains emanate, the number of branch chains being equal to the functionality of the initiator. As a further example, ployesters have been prepared having one hundred or more branch chains. Thus, a copolymer of vinyl toluene and hydroxy propyl acrylate has been prepared by known polymerization methods to give a product having about one hundred alcoholic groups per linear chain.

Desirable polyesters have been prepared with hydroxy or carboxy copolymers as initiators by reacting propylene oxide and maleic anhydride in the presence of those copolymers. It is understood that in the preparation of these polyesters a modicum of initiator is used in proportion to the monoepoxide and dibasic acid anhydride since the function of the initiator is to serve as a nucleus from which the branch chains emanate. A very small amount of initiator is used if a high molecular weight product is desired. And, as the amount of initiator of nucleus-forming material is increased, the length of branch chains is decreased. Thus, if dipentaerythritol were employed as the initiator and one mol of dipentaerythritol was employed with sixty mols of monoepoxide and sixty mols of dibasic acid anhydride on the average each branch chain in the linear polyester would contain twenty mols of monoepoxide and twenty mols of anhydride. However, if two mols of the initiator were employed, rather than one, each branch chain in the polyester would normally contain ten mols of monoepoxide and only ten mols of dibasic acid anhydride. It is apparent then that the more initiator, the shorter the branch chains will be. The ratio of reactants to initiator therefore depends upon the desired size of the molecule and proportions are not critical. The number of branch chains will be equal to the functionality of the initiator and the length of each branch chain will be approximately equal to the total number of mols of monoepoxide plus the total number of mols of anhydride per mol of the initiator compound, divided by the functionality of the initiator compound. In the light of these considerations, the amount of monoepoxide and dibasic acid anhydride to be reacted in the presence of the initiator can readily be determined in each case by one skilled in the art. As a general statement, it can be said that the mol ratio of monoepoxide to anhydride is in the range of 2:1 to 1:2 and the mol ratio of anhydride plus monoepoxide to the initiator is greater than 7:1.

A feature of this invention is that unsaturated polyesters can be prepared which can be subsequently cured, for example, with vinyl monomers, to give desirable castings and pottings. These compositions which can be cured with a vinyl monomer, are made by the use of an unsaturated dibasic acid anhydride or an unsaturated monoepoxide as a reactant. The use of, say, maleic acid anhydride, results in the presence of recurring double bonds in each branch chain. Double bonds in each branch chain will also result from the use of an unsaturated monoepoxide. For example, allyl glycidyl ether can be used. However, as indicated, it is undesirable to employ an unsaturated monoepoxide in combination with an unsaturated dibasic acid anhydride, for instance, allyl glycidyl ether in combination with maleic acid anhydride. In addition, coatings, castings and pottings can also be prepared by reacting both saturated or unsaturated polyesters of this invention with urea-formaldehyde resins.

An advantage of this invention is that polyesters can be prepared having molecular weights approximately equal to any desired molecular weight. The proportions of reactants to give a linear polyester of a theoretical molecular weight can be calculated and when these proportions are used a polyester can be prepared which has a molecular weight which corresponds approximately with the calculated theoretical molecular weight. When an initiator is used which is capable of reacting only with an organic acid anhydride, the following formula can be used to theoretically calculate the molecular weight of the polyester which it is desired to prepare.

$$mwS + mwA \cdot nA + mwE[nA - (f-z)] = mwP$$

In this formula $mwS$ represents the molecular weight of the initiator, $mwA$ represents the molecular weight of the dibasic acid anhydride and $mwE$ represents the molecular weight of the monoepoxide, $mwP$ is the theoretical molecular weight of the polyester, $nA$ represents the number of mols of anhydride, $f$ represents the functionality of the initiator, and $z$ represents the number of terminal hydroxy groups desired in the polyester. From the equation and using a desired theoretical molecular weight of the polymer, the number of mols of anhydride can be calculated. The formula is based upon a ratio of initiator to anhydride to epoxide of 1 to $nA$ to $nA-(f-z)$. The number of mols of epoxide, therefore, can be derived from $nA-(f-z)$ since $nA$, $f$ and $z$ will all be known quantities. Referring again to $z$, when the initiator is capable of reacting with an epoxide group and not an anhydride the formula is the same but $z$ represents the number of terminal carboxyl groups desired.

In carrying out this invention it is generally desirable to melt the mixture of dibasic acid anhydride and initiator, to slowly add the monoepoxide, while heating the reaction mixture at a temperature of 120° C. to 150° C. until there is no change in acid value. In many instances, acid values of from 1 to 10 will be obtained, indicating substantially complete reaction and a product approaching the theoretical. However, in some cases, as where polymeric nuclei having a functionality of over 100 are used, acid values up to 20 are usually obtained, especially where very high molecular weight products are being prepared. In the case of low boiling monoepoxides rather than taking acid numbers it is convenient to judge the reaction by the reflux. After all of the low boiling monoepoxide has been added, the temperature is raised as reflux permits, to approximately 150° C. and this temperature is maintained until reflux ceases, indicating that monoepoxide has been consumed. If a higher boiling monoepoxide, is employed, that is, one having a boiling point above 140° C. to 150° C., no reflux will be observed.

For a further understanding of the invention, reference is made to the following specific examples, the viscosities given being Gardner-Holdt viscosities run at 25° C. These examples are intended to be illustrative of the invention only, since different embodiments can be made without departing from this invention.

Example 1

To prepare a branched chain thermoplastic polyester having four branch chains and a theoretical molecular weight of 5928, propylene oxide, pentaerythritol, maleic anhydride, and phthalic anhydride are employed in a mol ratio of 11½ to ¼ to 4 to 4. The pentaerythritol (24.1 grams), maleic acid anhydride (279.1 grams), phthalic acid anhydride (421.5 grams), and propylene oxide (475.0 grams) are heated together in a two liter, three neck, round bottom flask provided with a stirrer, thermometer, dropping funnel and a Dry Ice condenser. When the temperature in the reaction vessel reached 120° C. to 125° C., propylene oxide was added through the dropping funnel to the flask contents at a rate sufficient to maintain a heavy reflux at a temperature of 120° C. The drop-wise addition of the propylene oxide requires approximately 15 hours. When all the propylene oxide is added and the reflux diminishes, the temperature of the flask contents is raised to 150° C., as the reflux permits and held at a temperature until the reflux ceases. The product is then heated and vacuum distilled for ten minutes at 2 mm. Hg. The contents of the resulting product are: acid value, 11; viscosity, $Z-Z_1$ at 66.7 percent solids in styrene; color, 4–5 at 66.7 percent solids in styrene.

Strength properties on the preceding product are determined on specimens machined from sheet castings prepared by casting blends of the polyester, with styrene, using a catalyst. The molds are made from two 8" x 12" x ¼" glass plates wrapped with cellophone so that one side of each plate is free of wrinkles. These plates are then assembled, smooth side inward, into a mold by using ¼" polyvinyl chloride-acetate plastic tubing as a gasket on three of the four edges, and using six C-clamps to hold the two plates together. The clamps are tightened so as to form a ³⁄₁₆" cavity between the glass plates. The resin solutions are poured into the mold, while the latter is in a vertical position. The catalyst is a paste of fifty percent benzoyl peroxide, and fifty percent tricresyl phosphate.

Styrene (120 grams) containing 500 p.p.m. tertiary butyl catechol, and the product of this example (180 grams) are blended together using heat to effect solution. This solution is cooled to 25° C. to 30° C. and catalyst (six grams) is added. The resulting solution is poured into a mold of the type described above. The mold is placed upright in a 75° C. oven and allowed to remain one hour. The oven temperature is then raised to 121° C. and the mold contents are held at this temperature for one hour. The mold contents are then removed from the oven, allowed to cool to 30° C. to 40° C., and the resulting casting removed from between the glass plates. This casting is clear and very hard, having the following strength properties on the casting:

Tensile strength _____ p.s.i__ 7700
Flexure strength _____ p.s.i__ 17400
Impact strength _____ ft. lb./inch of notch__ 0.30
Alpha-hardness _____ 111

Example 2

To prepare a branched chain thermoplastic polyester having four branch chains and a theoretical molecular weight of 4432, propylene oxide, pentaerythritol, maleic anhydride, and phthalic anhydride are employed in a mol ratio of 11 to ½ to 4 to 4. The pentaerythritol (48.2 grams), maleic acid anhydride (278.3 grams), phthalic acid anhydride (420.2 grams), and propylene oxide (453.0 grams) are reacted together in a manner described in Example 1. The addition of the propylene oxide requires approximately thirteen hours. The product is then taken to 150° C., held until reflux ceases, and vacuum distilled for ten minutes at 2 mm. g. Constants found on the product are as follows: acid value, 11; viscosity, V–W at 66.7 percent solids in styrene; color, 3–4 at 66.7 percent solids in styrene.

Styrene (120 grams) containing 500 p.p.m. tertiary butyl catechol, the product of this example (180 grams), and catalyst (six grams) are blended together and processed to a cast sheet, using the procedure of Example 1. The resulting casting is clear and rigid, having the following strength properties:

Tensile strength _____ p.s.i__ 6500
Flexure strength _____ p.s.i__ 13500
Impact strength _____ ft. lb./inch of notch__ 0.25
Alpha-hardness _____ 111

Example 3

In order to prepare a branched chain thermoplastic polyester having four branch chains and a theoretical molecular weight of 1584, propylene oxide, pentaerythritol, maleic anhydride and phthalic anhydride are employed in a mol ratio of 11 to 1 to 4 to 4. The pentaerythritol (92.8 grams), maleic acid anhydride (267.5 grams), phthalic acid anhydride (404.0 grams) and propylene oxide (435.5 grams) are reacted together using the procedure described in Example 1. The addition of the propylene oxide requires approximately ten hours. After raising the temperature to 150° C., and maintaining this temperature until reflux ceases, the resulting product is vacuum distilled ten minutes at 2 mm. Hg. Constants on the product are as follows: acid value, 7; viscosity, N–O at 66.7 percent solids in styrene; color, 1–2 at 66.7 percent solids in styrene.

Styrene (120 grams) containing 500 p.p.m. tertiary butyl catechol, the product of this example (180 grams), and catalyst (six grams) are blended together and a casting is prepared from this solution using the procedure of Example 1. The following strength properties are obtained from this casting:

| | |
|---|---|
| Tensile strength _____p.s.i__ | 5800 |
| Flexure strength _____p.s.i__ | 11000 |
| Impact strength _____ft. lb./inch of notch__ | 0.25 |
| Alpha-hardness _____ | 103 |

Example 4

In order to prepare a branched chain thermoplastic polyester having six branch chains and a theoretical molecular weight of 2606, using dipentaerythritol as the initiator, propylene oxide, dipentaerythritol, maleic anhydride, and phthalic anhydride are employed in a mol ratio of 11 to ⅓ to 4 to 4. The dipentaerythritol (61.2 grams), maleic acid anhydride (275.5 grams), phthalic acid anhydride (415.9 grams) and propylene oxide (448.4 grams) are reacted together following the procedure set forth in Example 1. The addition of propylene oxide to the flask contents requires approximately 15 hours after which the temperature is raised to 150° C. as the reflux permits. Temperature is held at 150° C. until reflux ceases and the product is then vacuum distilled for ten minutes at 2 mm. Hg. A product having the following constants results: acid value, 3; viscosity, W–X at 66.7 percent solids in styrene; color, 4–5 at 66.7 percent solids in styrene.

Styrene (120 grams) containing 500 p.p.m. tertiary butyl catechol, the product of this example (180 grams) and catalyst (six grams) are blended together and made into a casting using the procedure described in Example 1. The blend produces a clear, rigid casting which possesses the following strength properties:

| | |
|---|---|
| Tensile strength _____p.s.i__ | 6600 |
| Flexure strength _____p.s.i__ | 15000 |
| Impact strength _____ft. lb./inch of notch__ | 0.26 |
| Alpha-hardness _____ | 112 |

Example 5

Part (a).—A polyhydroxy polyether is prepared by reacting bisphenol, epichlorohydrin, ethylene chlorohydrin, and sodium hydroxide in the following molar ratios:

| | Mols |
|---|---|
| Bisphenol _____ | 5 |
| Epichlorohydrin _____ | 4 |
| Ethylene chlorohydrin _____ | 2 |
| Sodium hydroxide _____ | 6.9 |

In a suitable vessel, bisphenol (1284 grams), sodium hydroxide (211 grams), and water (3110 grams) are combined and heated to 50° C. To this reaction mixture epichlorohydrin (417 grams) and ethylene chlorohydrin (181 grams) are added. The temperature of the mixture is raised to 95–100° C. and held for 1½ hours. The product, washed until it is neutral to litmus, and dried, has a melting point of 98° C. (Durrans Mercury Method) and a Gardner-Holdt viscosity of R–S at forty percent solids in butyl carbitol. The resulting linear polyether polymer contains two terminal alcoholic hydroxyl groups and four intermediate alcoholic hydroxyl groups and has a molecular weight of approximately 1400.

Part (b).—To prepare a branched chain thermoplastic polyester having six branch chains, using the polyhydroxy polyether of Part (a) as the initiator, propylene oxide, polyhydroxy polyether, maleic anhydride and phthalic anhydride are employed in a mol ratio of 11 to ⅓ to 4 to 4. The polyhydroxy polyether (272.4 grams), maleic acid anhydride (224.4 grams), phthalic acid anhydride (338.4 grams), and propylene oxide (340.0 grams) are reacted together according to the procedure set forth in Example 1. The propylene oxide addition requires approximately 15 hours. The temperature is then raised to 150° C. and held at this temperature until reflux ceases. The product, after being vacuum distilled for ten minutes at 2 mm. Hg has the following constants: acid value, 1.9; viscosity, X–Y at 66.7 percent solids in styrene; color, 3–4 at 66.7 percent solids in styrene.

Styrene (120 grams) containing 500 p.p.m. tertiary butyl catechol, the product of this example (180 grams), and catalyst (six grams) are blended together and processed into a casting using the procedure described in Example 1. The resulting casting is clear and rigid and possesses the following strength properties:

| | |
|---|---|
| Tensile strength _____p.s.i__ | 5700 |
| Flexure strength _____p.s.i__ | 9000 |
| Impact strength _____ft. lb./inch of notch__ | 0.27 |
| Alpha-hardness _____ | 97 |

Example 6

Using pyromellitic acid as the initiator, to prepare a polyester having four branch chains, propylene oxide, pyromellitic acid, maleic anhydride and phthalic anhydride are used in a mol ratio of 11 to ½ to 4 to 4. The pyromellitic acid (87.1 grams), maleic acid anhydride (268.9 grams), phthalic acid anhydride (406.1 grams) and propylene oxide (437.6 grams) are reacted together in accordance with Example 1. The addition of the propylene oxide requires approximately four hours. The temperature is then raised to 150° C. as reflux permits and held until reflux ceases. Volatiles are then distilled off under a vacuum of 2 mm. Hg for ten minutes after which the following constants are determined: acid value, 31; viscosity, Y–Z at 66.7 percent solids in styrene; color, 8–9 at 66.7 percent solids in styrene.

Styrene (120 grams) containing 500 p.p.m. tertiary butyl catechol, the product of this example (180 grams), and catalyst (six grams) are blended together and made into a ⅛" casting, using the procedure described in Example 1. The product is a clear, rigid casting, having the following strength properties:

| | |
|---|---|
| Tensile strength _____p.s.i__ | 7700 |
| Flexure strength _____p.s.i__ | 15000 |
| Impact strength _____ft. lb./inch of notch__ | 0.29 |
| Alpha-hardness _____ | 115 |

Example 7

To prepare a branched chain polyester having six branch chains, using the polyhydroxy polyether of Part (a) of Example 5 as the initiator, butyl glycidyl ether, polyhydroxy polyether, maleic anhydride and phthalic anhydride are employed in a mol ratio of 8 to ⅓ to 4 to 4. The polyhydroxy polyether (226.8 grams), maleic acid anhydride (186.0 grams), phthalic acid anhydride (247.2 grams) are weighed into a two liter, three neck, round bottom flask, provided with a stirrer, thermometer, dropping funnel and six bulb water condenser, the latter attached directly to one neck of the flask. The flask contents are stirred continuously and heated to 150° C. At this temperature, butyl glycidyl ether (506.4 grams) is added through the dropping funnel over a period of approximately two hours. After this addition the flask contents are held at 150° C. After two hours, the acid value is found to be 21.2 and after five hours it is 18.5. The product is found to have the following constants: acid value, 18.4; viscosity, X–Y at 66.7 percent solids in styrene; color, 8–13 at 66.7 percent solids in styrene.

Example 8

With phloroglucinol as the initiator, a branched chain thermoplastic polyester having three branch chains is prepared by reacting phloroglucinol (44.0 grams), maleic acid anhydride (106.5 grams), phthalic acid anhydride (160.5 grams) and propylene oxide (189.0 grams) following the procedure for Example 2. The mol ratio of monoepoxide (propylene oxide) to phloroglucinol to maleic anhydride to phthalic anhydride is 12 to 1 to 4 to 4. The addition of the propylene oxide to the flask contents requires approximately eight hours. The temperature of the flask contents is raised to 150° C. as reflux permits and held at this temperature until reflux ceases. A product results having the following constants: acid value, 30; viscosity, T–U at 66.7 percent solids in styrene; color, 18+ at 66.7 percent solids in styrene.

Example 9

To prepare a branched chain thermoplastic polyester having three branch chains, using raw castor oil as the initiator, propylene oxide, raw castor oil, maleic anhydride and phthalic anhydride are employed in a mol ratio of 9 to ⅓ to 5 to 5. The raw castor oil (166.0 grams), having a weight per alcoholic hydroxyl of 332, maleic acid anhydride (245.3 grams), phthalic acid anhydride (370.3 grams) and propylene oxide (300.0 grams) are reacted together as set forth in Example 1. The addition of the propylene oxide requires approximately 11 hours, after which the temperature is raised to 150° C. and held until reflux ceases. After vacuum distillation (ten minutes at 2 mm. Hg) the product is found to have the following properties: acid value, 73; viscosity, W–V at 66.7 percent solids in styrene; color, 9–10 at 66.7 percent solids in styrene.

Styrene (120 grams) containing 500 p.p.m. tertiary butyl catechol, the product of Example 6 (180 grams), and catalyst (six grams) are blended together and processed into a casting using the procedure described in Example 1. The product is a clear, semi-rigid casting having the following strength properties:

| | |
|---|---|
| Tensile strength _____ p.s.i__ | 7200 |
| Flexure strength _____ p.s.i__ | 11900 |
| Impact strength _____ ft. lb./inch of notch__ | 0.31 |

Example 10

Part (a).—A 65–35 vinyl toluene-hydroxy propyl acrylate copolymer is prepared by combining (in the presence of 67 parts of a 50–50 mixture of xylene and methyl isobutyl ketone, in a flask equipped with condenser, thermometer and agitator) 65 parts of vinyl toluene, 15.5 parts of propylene oxide and 19.5 parts of acrylic acid (parts being based on a total of 100 parts for the three reactants). Catalysts for the process, 1.0 part of benzoyl peroxide and 2.0 parts of a 35 percent solution of benzyl trimethyl ammonium hydroxide in methanol, are added. The reaction mixture is refluxed until an acid value of less than one is obtained, approximately 14 hours. The resulting 54.7 percent solids solution contains a hydroxyl-containing linear copolymer having a weight per hydroxyl group of 371. Since the average molecular weight of the copolymer is believed to be in the neighborhood of 20,000, each molecule contains an average of 50 to 60 hydroxyl groups.

Part (b).—To use the vinyl toluene-hydroxy propyl acrylate copolymer of Part (a) of this example as the initiator, a branched chain thermoplastic polyester, having from about 50 to 60 branch chains is prepared from a ratio of mols of monoepoxide (propylene oxide) to equivalents of copolymer to mols of phthalic anhydride of 5 to 1 to 5, the copolymer (145.5 grams of a 54.7 percent solids solution), phthalic acid anhydride (158.4 grams), xylene (134.0 grams), and propylene oxide (62.1 grams) are reacted in accordance with the procedure of Example 7, except that the reflux temperature is from 120 to 125° C. The addition of the propylene oxide requires approximately three hours. The flask contents are held at a moderate reflux for an additional six hours, at which time the temperature has reached 138° C. The product is cooled and combined with 50 grams of methyl isobutyl ketone. The acid value of the solids portion of the product is 9.4.

Example 11

A branched chain thermoplastic polyester having from about 50 to 60 branch chains is prepared using the vinyl toluene-hydroxy propyl acrylate copolymer of Example 10, Part (a) as the initiator. The ratio of mols of monoepoxide (propylene oxide) to equivalents of copolymer to mols of phthalic anhydride is 10 to 1 to 10. The theoretical molecular weight of each branch is 2062. The copolymer (83.2 grams of a 54.7 percent solids solution), phthalic acid anhydride (182.7 grams), xylene (162.4 grams), and propylene oxide (71.7 grams) are reacted in accordance with the procedure of Example 10. The propylene oxide is added to the flask contents over a period of approximately six hours, at a rate sufficient to maintain a moderate reflux at 120° C. to 125° C. Flask contents are held at moderate reflux for four hours after all the propylene oxide is added. A mixture of 150 grams of methyl isobutyl ketone and 20 grams of Cellosolve acetate is added to the product. The acid value of the solids portion of the product is 10.8.

Example 12

A branched chain thermoplastic polyester having from about 50 to 60 branch chains is prepared using the vinyl toluene-hydroxy propyl acrylate copolymer of Example 10, Part (a) as the initiator. The ratio of mols of monoepoxide (propylene oxide) to equivalents of copolymer to mols of phthalic anhydride is 20 to 1 to 20. The theoretical molecular weight of each branch is 4124. The copolymer (45.3 grams of a 54.7 percent solids solution), phthalic acid anhydride (19.7 grams), xylene (89.7 grams), methyl isobutyl ketone (89.6 grams), and propylene oxide (78.0 grams) are reacted in accordance with the procedure of Example 10. A portion of the propylene oxide (50 grams) is added to the flask contents at 120° C. to 125° C. over a period of 4½ hours. After this portion of propylene oxide is added to the flask contents, they are held approximately four hours at a moderate reflux of 120° C. to 130° C. Benzyl trimethyl ammonium chloride crystals (three grams) are then added to the flask contents to catalyze the reaction. The additional 28 grams of propylene oxide are then added at 120° C. to 130° C. over a period of approximately 40 minutes. The flask contents are then held at a moderate reflux for an additional 40 minutes. The product is then combined with Cellosolve acetate (50 grams). The acid value of the solids portion of the product is 15.7.

Example 13

To prepare a carboxyl terminated branched chain thermoplastic polyester having from about 50 to 60 branch chains, the vinyl toluenehydroxy propyl acrylate copolymer of Example 10 is used as an initiator. The ratio of mols of monoepoxide (propylene oxide) to equivalents of copolymer to mols of phthalic anhydride is 4 to 1 to 5. The initiator (221.0 grams of a 54.7 percent solids solution of the copolymer) and phthalic acid anhydride (212.8 grams) are weighed into a one liter flask equipped with stirrer, thermometer, dropping funnel and six bulb water condenser. The flask contents are heated to a temperature of 120° C. to 125° C. while being constantly stirred. Propylene oxide (66.4 grams) is added to the flask contents through the dropping funnel over a period of approximately two hours. At this point, xylene (50 grams) is then added and the temperature is raised to reflux condititons (127° C. to 130° C.). The system is held at moderate reflux for another 80 minutes, at which time the reflux temperature is 138° C. to 140° C. Additional 50 grams of xylene and 50 grams of methyl isobutyl ketone are added and the product is allowed to cool. The following constants are determined on the product: Non-volatiles (two hours at 150° C.), 57.9 percent; acid value (non-volatile portion), 54.3 viscosity (⅔ of the cooled product, ⅓ styrene, Q–R.

Example 14.—Vinyl toluene/butyl acrylate/methacrylic acid copolymer with 20.4 percent phthalic anhydride modification To a suitable reaction flask equipped with a mechanical stirrer, condenser, thermometer, and dropping funnel were added 59.5 parts of xylene and 59.5 parts of methyl isobutyl ketone. To the dropping funnel were added 44.7 parts of vinyl toluene, 98.1 parts of butyl acrylate, 35.7 parts of methacrylic acid and 3.6 parts of benzoyl peroxide. Heat was applied to the flask and at 120° C. addition of the monomer-catalyst solution was begun, the addition being completed in 45 minutes. Heating was continued at 118–120° C. for one hour and 50 minutes. Sixty parts of xylene were then added to the flask and heating was continued at 118° C. for 45 minutes. After the further addition of 100 parts of xylene, the reactants were heated at 118–119° C. for four hours and 20 minutes. The resulting copolymer solution had a solids content of 36.8 percent indicating 94.5 percent conversion of monomers to polymers.

The copolymer solution was cooled to 67° C. and three parts of triethylamine were added. Heat was applied and at 110° C. the addition of 26.5 parts of propylene oxide was begun and completed over a period of 33 minutes. Heating was continued at 103–120° C. for three hours and 18 minutes, after which time the acid value, on solids basis, was 7. The reactants were cooled to room temperature and 61.2 parts of phthalic anhydride were added. Heat was reapplied and at 110° C. the addition of 33.8 parts of propylene oxide was begun and completed over a period of 42 minutes. The reactants were then heated at 113–120° C. for 35 minutes. The resulting phthalic modified copolymer solution had an acid value of 4 on solids basis and a Gardner-Holdt viscosity of R at 48.6 percent solids.

To 15.4 parts of the modified copolymer solution were added five parts of an isobutylated methylol melamine resin at 50 percent solids in isobutynol. Three mil films were prepared on glass and were baked 30 minutes at 150° C. The resulting well-cured films were clear and colorless, had good mar resistance, and were flexible and tough.

Example 15.—Butyl acrylate/methacrylic acid copolymer modified with 20.4 percent phthalic anhydride To a suitable reaction flask equipped as described in Example 14 were added 59.5 parts of xylene and 59.5 parts of ethylene glycol monoethyl ether acetate. To the dropping funnel were added 142.8 parts of butyl acrylate, 35.7 parts of methacrylic acid and 3.6 parts of benzoyl peroxide. Heat was applied raising the temperature of the flask contents to 120° C. The addition of the monomer-catalyst solution was begun and continued over a period of 45 minutes while holding the temperature between 117–135° C. The temperature was held at 117–126° C. for six hours. The solids content of the copolymer solution was 59.9 percent indicating 100 percent conversion of monomers to polymers.

To the copolymer solution were added 160 parts of xylene and three parts of triethyl amine. Heat was applied and at 110° C., 26.5 parts of propylene oxide were slowly added over a period of 41 minutes. The reactants were then held at 118–120° C. for two hours and 25 minutes, after which time the acid value was 5.4, on solids basis.

The reactants were cooled to 80° C. and 61.2 parts of phthalic anhydride were added. Heat was reapplied and at 110° C., 33.8 parts of propylene oxide were added over a period of 52 minutes. After heating at 110° C. for one hour and 17 minutes, the acid value of the reactants on a solids basis was less than one. The resulting phthalic modified copolymer solution had a Gardner-Holdt viscosity of F–G.

A blend was prepared from 14.4 parts of the modified copolymer solution, five parts of an isobutylated methylol melamine resin at 50 percent solids in isobutanol, 0.6 part xylene, and 0.16 part of the morpholine salt of butyl acid phosphate at 50 percent solids in the monobutyl ether of ethylene glycol. Three mil films were prepared on glass and were baked at 150° C. for 30 minutes. The well-cured films were clear and exhibited high gloss, excellent mar resistance and excellent flexibility.

Example 16.—Butyl acrylate/methacrylic acid copolymer with 20.9 percent phthalic anhydride modification Using the same procedure as described in Examples 14 and 15, a copolymer was prepared from 146.6 parts of butyl acrylate and 36.6 parts of methacrylic acid with 3.6 parts of benzoyl peroxide catalyst and 59.9 parts of ethylene glycol monomethyl ether acetate. This copolymer solution was then reacted with 54.3 parts of propylene oxide and 62.7 parts of phthalic anhydride with three parts of triethyl amine catalyst to an acid value of 9 on a solids basis.

A blend was prepared from 11.7 parts of the modified copolymer solution (70 percent solids), six parts of an isobutylated methylol melamine resin at 50 percent solids in isobutanol, 2.3 parts of ethylene glycol monomethyl ether acetate and five parts of n-butanol. Three mil films were prepared on glass and were baked at 150° C. for 30 minutes. The well-cured films had good mar resistance and adhesion.

Example 17.—Butyl acrylate/methacrylic acid copolymer with 21.2 percent phthalic anhydride modification Using the same procedure as previously described, a copolymer solution was prepared from 150 parts of butyl acrylate and 36.9 parts of methacrylic acid with 3.6 parts of benzoyl peroxide catalyst, 59.5 parts of xylene and 59.9 parts of ethylene glycol monomethyl ether acetate. The resulting copolymer solution was further reacted as previously described with 63.6 parts of phthalic anhydride and 49.8 parts of propylene oxide using three parts of triethyl amine catalyst to an acid value of 23.1 on solids basis.

12.5 parts of the resulting solution (60 percent solids) was blended with five parts of an isobutylated methylol melamine resin at 50 percent solids in isobutanol, and 2.5 parts of xylene. Three mil films were prepared on glass and were well cured after 30 minutes heating at 150° C. The films had excellent mar resistance and good adhesion. Two mil films prepared on electrolytic tin plate and baked for 30 minutes at 150° C. passed a 28 inch-pound impact test.

Example 18.—Butyl acrylate/styrene/methacrylic acid copolymer modified with 40 percent phthalic anhydride A copolymer solution was prepared by reacting 65.7 parts of butyl acrylate, 28.2 parts of styrene and 23.4 parts of methacrylic xylene, and 15.6 parts of ethylene glycol monoethyl ether acetate. After the addition of 100 parts of xylene, the copolymer solution was heated to 115° C. 1.5 parts of benzyl dimethyl amine were added and addition of 15.2 parts of propylene oxide was begun. After the addition of the propylene oxide was completed (37 minutes), the temperature was held at 105° C. to 121° C. for one hour and 40 minutes, at which time the acid value was 24.9 on solids basis. The reactants were cooled to 30° C. and 120 parts of phthalic anhydride were added. Heat was reapplied and at 120° C., the addition of 47.5 parts of propylene oxide was begun. The propylene oxide was added over a period of one hour and 12 minutes, during which time the reaction temperature dropped to 98° C. Heating was continued for one hour and 45 minutes while the temperature slowly rose to 121° C. The acid value was then 26.5 on solids basis. Fifty parts of ethylene glycol monoethyl ether acetate were added and the reactants were heated at 120° C. to 123° C. for 30 minutes, after which time the acid value was 23.7. After the addition of 50 parts of ethylene glycol monoethyl ether acetate, the resulting solution had a Gardner-Holdt viscosity of V, a Gardner color of 3 to 4 and a solids content of 51.4 percent.

A blend was prepared from 85 weight percent of the modified copolymer and 15 percent of an isobutylated methylol melamine resin (based on solids). Three mil films were prepared on glass and were baked at 150° C. for 30 minutes. The resulting clear, well-cured films had excellent mar resistance and good water resistance.

Example 19.—Butyl acrylate/styrene/methacrylic acid copolymer with 21.2 percent phthalic anhydride modification To a suitable reaction flask equipped as described in Example 14 were added 95.2 parts of xylene, 23.8 parts of ethylene glycol monoethyl ether acetate and 9.3 parts of cumene hydroperoxide. Heat was applied raising the temperature of the flask contents to 135° C. A monomer mixture (35 parts butyl acrylate, 15 parts styrene and 12.3 parts methacrylic acid) was added over a period of 45 minutes while holding the temperature at 135° C. to 140° C. The temperature was then held at 135° C. to 138° C. for six hours. Solids content of the solution was then determined to be 95.1 percent indicating 97 percent conversion of monomers to polymers.

Xylene, 81 parts, and benzyl dimethyl amine, 1.5 parts, were added to the copolymer solution and a slow stream of nitrogen was introduced into the flask. 26.5 parts of propylene oxide were added to the flask over a period of 35 minutes while holding the temperature at 100° C. to 115° C. After additional heating at 110° C. to 120° C., for two hours and 40 minutes, the acid value, based on theoretical solids, was 23.9. The flask contents were cooled to 45° C. and 63.6 parts of phthalic anhydride were added. Heat was reapplied raising the temperature to 115° C. 23.3 parts of propylene oxide were then added over a period of 45 minutes at 115° C. After 70 minutes additional heating at 120° C., the resulting phthalic modified copolymer solution had a Gardner-Holdt viscosity of Z to $Z_1$, Gardner color of 1, solids content of 58.2 percent and acid value of 28.8 based on solids.

Blends were prepared from the modified copolymer and a butylated methylol melamine resin (85–70 percent copolymer solids to 15–30 percent melamine resin solids). Well cured films having good mar resistance, hot water resistance and adhesion were obtained after 30 minutes at 150° C.

Example 20. — Butyl acrylate/styrene/methacrylic acid copolymer with 32.9 percent phthalic anhydride modification A copolymer was prepared as described in Example 19 from 34.5 parts of styrene, 80.4 parts of butyl acrylate and 28.5 parts of methacrylic acid using 7.2 parts of cumene hydroperoxide catalyst and 76.5 parts of xylene and 19.1 parts of ethylene glycol monoethyl ether acetate as solvents. The resulting copolymer solution had a solids content of 60 percent indicating 100 percent conversion of monomers to polymers.

To the copolymer solution were added 100 parts of xylene and 1.5 parts of benzyl dimethyl amine. 19.3 parts of propylene oxide were added over a period of 23 minutes at 100° C. to 115° C. The reactants were then heated for two hours at 120° C. under a slow stream of nitrogen. The acid value at this point was 30.1, based on solids. After an additional one hour at 120° C., the acid value was 19.6, based on solids. The flask contents were cooled to 30° C. and 98.7 parts of phthalic anhydride were added. Heat was reapplied and at 115° C., 38.6 parts of propylene oxide were added over a one hour period. After two hours and 30 minutes additional heating at 120° C., the acid value was 21.1 based on solids. The resulting phthalic modified copolymer solution had a Gardner-Holdt viscosity of $Z_4$ to $Z_5$ and a Gardner color of 3–4 at 59.6 percent solids.

Blends were prepared from the modified copolymer and an isobutylated methylol melamine resin using 85 percent to 70 percent copolymer and 15 percent to 30 percent melamine resin (based on solids). Well cured films having good mar resistance, adhesion and hot water resistance were obtained after a 30 minute bake at 150° C.

Example 21.—Butyl acrylate/styrene/methacrylic acid copolymer modified with 15.2 percent maleic anhydride As described in Example 19, a copolymer was prepared from 112.2 parts of butyl acrylate, 48.6 parts of styrene and 39.6 parts of methacrylic acid using 10 parts of cumene hydroperoxide catalyst and as solvents 76.5 parts of xylene and 19.1 parts of ethylene glycol monoethyl ether acetate.

To the copolymer solution were added 1.2 parts of benzyl dimethyl amine and 100 parts of xylene. Thirty-five parts of propylene oxide were added to the solution over a period of two hours at 110° C. to 113° C. Heating was continued for three hours at 107° C. to 118° C. after which time the acid value of the reactants on solids basis was 7.7. Five additional parts of propylene oxide were added to the flask and heating at 120° C. was continued for one hour and 30 minutes to an acid value of 2.1. The reactants were cooled to 75° C. and 45.6 parts of maleic anhydride were added. The temperature was raised to 110° C. and 14 parts of propylene oxide were added in 31 minutes. Heating was continued at 117° C. to 121° C. for 50 minutes. The acid value at this point was 39.2 on solids basis. 104.4 parts of xylene were added and heating at 120° C. was continued for 30 minutes. After the addition of 100 parts of xylene, the acid value was determined to be 27.8 on solids basis.

Three mil films were prepared on glass from a blend of the modified copolymer solution and an isobutylated methylol melamine resin (85 weight percent copolymer and 15 weight percent melamine resin based on solids). After a 30 minute bake at 150° C., the films were well cured and had excellent gloss, mar resistance, adhesion and flexibility.

Example 22.—Maleinized oil as initiator for polyester

To a suitable reaction flask equipped with a thermometer, stirrer, condenser and dropping funnel were added 167.4 parts of linseed oil and 56.1 parts of maleic anhydride. The reactants were heated at 200° C. for two hours and 30 minutes to form the maleic adduct of the oil. The adduct was cooled to 100° C., 15.5 parts of water and three parts of triethyl amine were added, and heating at 100° C. was continued for two hours to open the anhydride rings. Seventy-three parts of propylene oxide were added over a one hour and 30 minute period while holding the temperature at 76° C. to 85° C. Heating was continued for nine hours and 20 minutes while the temperature rose to 135° C. and the acid value leveled off at 38.6. One hundred parts of xylene were added and were distilled off to remove any water in the flask. 140.7 parts of phthalic anhydride were added and the reactants were heated at 120° C. for one hour. Seventy-three parts of propylene oxide were then added over a one hour period at 98° C. to 110° C. After one hour and 40 minutes heating, the temperature rose to 120° C., and the acid value was 12.8. The product when dissolved at 68.5 percent solids in xylene had a Gardner-Holdt viscosity of $Z_5$.

To 14.6 parts of the solution of polyester modified maleinized oil were blended 8.7 parts of xylene and 16.7 parts of a butylated urea-formaldehyde resin at 60 percent solids in xylene and butanol. Three mil films were prepared on glass and were baked for 30 minutes at 180° C. Well-cured films having excellent flexibility, mar resistance and adhesion were obtained.

Example 23.—Novolak resin as initiator for polyester

To a reaction flask equipped as described in Example 14 were added 66.6 parts of a para-phenyl phenol formaldehyde resin having a melting point of 90° C. to 107° C., 82.2 parts of phthalic anhydride, 54.6 parts of maleic anhydride and 20 parts of xylene. Heat was applied to the flask raising the temperature of the reactants to 120° C. One part of pyridine catalyst was added and slow addition of 96.6 parts of propylene oxide was begun while holding the temperature between 115° C. and 125° C. All the propylene oxide was added after two hours and 15 minutes. The viscosity of the reactants was reduced with 100 parts of xylene and the flask contents were heated for six hours at 90° C. to 100° C. to complete the polyester formation. The resulting product had an acid value of 28.5 on a solids basis and a percent solids of 71.5.

Films prepared from this solution and 30 to 50 weight percent on solids basis of an alkylated urea-formaldehyde resin were well cured after 30 minutes at 180° C.

Example 24.—Epoxy resin-phthalic alkyd containing 21 percent phthalic anhydride

To a suitable reaction flask were added 319.2 parts of a glycidyl polyether of bisphenol A (reaction product of 1.57 mols of epichlorohydrin and one mol of bisphenol A having an epoxide equivalent weight of 485), 280.8 parts of soya fatty acids and 10 parts of xylene. The reactants were heated to 200° C. and were held at 200° C. for seven hours until the acid value was 7.5.

To 218 parts of the above epoxy ester (93 percent solids in xylene) were added 69.3 parts of phthalic anhydride and 50 parts of xylene. The temperature was raised to 100° C. and 1.5 parts of tertiary amine catalyst were added. Addition of 52.3 parts of propylene oxide was begun and was continued for three hours while holding the temperature between 97° C. and 100° C. After an additional two hours heating at 101° C. the acid value was 2.5. When dissolved at 74 percent solids in xylene, the Gardner-Holdt viscosity was W to X.

Films were prepared from the above reaction product using 0.03 percent cobalt and 0.03 percent manganese driers. After drying overnight the films were tack free and hard.

Example 25.—Epoxy resin-phthalic alkyd containing 31 percent phthalic anhydride

Using the same procedure as described in Example 24, 321 parts of the glycidyl polyether described in Example 24 and 179 parts of soya fatty acids were reacted to an acid value less than one. Three hundred and fifty-eight parts of the epoxy ester solution (75 percent solids in xylene) were then reacted with 152.5 parts of phthalic anhydride and 80.5 parts of propylene oxide to an acid value of 1.4. Films prepared from resulting product, using 0.03 percent cobalt and 0.03 percent manganese driers, were well cured after an overnight dry.

Example 26.—Epoxy resin-phthalic alkyd containing 23 percent phthalic anhydride

As described in Example 24, 225.2 parts of a glycidyl polyether of bisphenol A (reaction product of 1.22 mols epichlorohydrin and one mol of bisphenol A, having an epoxide equivalent weight of 900) were reacted with 174.8 parts of soya fatty acids to an acid value less than one. Two hundred and eighty-eight parts of a solution of the epoxy ester in xylene (65.7 percent solids) were reacted with 69.9 parts of phthalic anhydride and 41.4 parts of propylene oxide to an acid value of 1.3. Films prepared from this resin, using 0.03 percent cobalt and 0.03 percent manganese driers, were well cured after an overnight dry.

Example 27.—Difatty ester of the diglycidyl ether of bisphenol A as initiator for polyesters To a suitable reaction flask were added 59.4 parts of the diglycidyl ether of bisphenol A (epoxide equivalent weight—182), 67.8 parts of coconut fatty acids and 0.51 part of sodium hydroxide catalyst. The reactants were heated at 150° C. until the acid value was lowered to 4.7 indicating substantially complete reaction of the fatty acids and epoxide groups.

To the epoxy resin-fatty acid partial ester were added 127.8 parts of maleic anhydride and 193.2 parts of phthalic anhydride. Heat was applied raising the temperature to 118° C. Slow addition of propylene oxide was begun. One hundred and sixty-seven parts of propylene oxide were added over a period of six hours and 45 minutes while holding the temperature between 114° C. and 134° C. The resulting product had an acid value of 15.

185.3 parts of the reaction product were dissolved in 116 parts of styrene with six parts of benzoyl peroxide catalyst. The solution was poured into a mold and was cured by heating at 75° C. for one hour and at 121° C. for one hour. The cured casting had a tensile strength of 1800 p.s.i. and a flexure strength of 2200 p.s.i.

Example 28.—Rosin-maleic adduct as initiator for polyester

To a suitable reaction flask equipped with a stirrer, condenser, and thermometer were added 436 parts of maleic anhydride and 1564 parts of rosin (softening point 78° C., acid value 166). Heat was applied raising the temperature to 160° C. in 36 minutes. The temperature was then slowly raised to 275° C. over a period of two hours and 15 minutes to complete the adduction of maleic anhydride with the rosin.

To 290.4 parts of the rosin-maleic anhydride adduct were added 49.2 parts of propylene glycol. The temperature of the reactants was raised to 158° C. in order to open the anhydride rings with the glycol. After cooling the reactants to ambient temperatures, 254.4 parts of maleic anhydride and 192 parts of phthalic anhydride were added. Heat was reapplied and at 120° C. addition of propylene oxide was begun. Three hundred and sixty-three parts of propylene oxide were added over a period of 16 hours while keeping the temperature between 120° C. and 140° C. The resulting product had an acid value of 34.6.

One hundred and eighty parts of the above reaction product were dissolved in 120 parts of styrene with six parts of benzoyl peroxide catalyst. The reactants were poured into a mold and were cured after one hour at 75° C. and one hour at 121° C.

Example 29

To a suitable reaction flask equipped with a mechanical stirrer, thermometer, condenser and dropping funnel were added 22.8 parts of trimethylol propane, 150.6 parts of maleic anhydride and 228 parts of phthalic anhydride. Heat was applied raising the temperature of the reactants to 75° C. Twenty parts of toluene were added and the temperature of the reactants was raised to 125° C. where a clear solution was obtained. 198.6 parts of propylene oxide were added to the dropping funnel and slow addition of propylene oxide to the flask was begun. The propylene oxide was slowly added over a period of nine hours and 30 minutes while keeping the temperature between 95° C. and 125° C. Heating was continued at 120° C. to 123° C. for six hours and 30 minutes. At the end of this heating period, the acid value of the reactants was 90. Ten parts of toluene were added to the flask and an additional 30 parts of propylene oxide were added over a period of three hours and 45 minutes, while keeping the temperature at 110° C. to 120° C. After heating for three more hours, the acid value was 46. The volatiles were removed from the reaction product by heating the product to 125° C. under water aspirator vacuum (20-30 mm. Hg pressure).

33.5 parts of the resinous reaction product were blended with 16.5 parts of styrene by gentle heating and stirring until a clear solution was obtained. 0.5 part of benzoyl peroxide was dissolved in the solution and the solution was poured into a mold. After heating for 1 hour at 75° C. and two hours at 120° C., a well cured, tough casting was obtained.

Example 30

Seven hundred and thirty-two grams of vinyl toluene, 405 grams acrylic acid, 363 grams propylene oxide, 30 grams benzoyl peroxide, 42.8 grams benzyl trimethyl ammonium hydroxide (35 percent solution in methyl alcohol), 850 grams xylene and 150 grams methyl isobutyl ketone were charged into a five liter flask equipped with an agitator, thermometer, and a six bulb condenser attached directly to the flask. The contents of the flask were heated to reflux temperature (75-80° C.) with agitation and held at maximum reflux for five hours. One hundred and ninety-five grams of xylene, 35 grams methyl isobutyl ketone were then added and reflux continued until the reaction solution had an acid value of 1 to 2 and a viscosity U–V. The contents of the flask are then distilled to remove the excess propylene oxide at a temperature of 120-123° C. Five hundred and ninety-one grams of phthalic anhydride were then added to the reaction mixture in the flask together with 213 grams of xylene and 598 grams methyl isobutyl ketone. The reaction mixture was then held at 100° C. for approximately one hour.

The resulting product had a solids content of 46.6 percent, a viscosity of $Z_2Z_3$ and a weight per carboxylic acid group (solids) of 422.

The foregoing examples illustrate the preparation of highly branched chain thermoplastic or linear polyesters according to this invention. The formation of the branched chain polyesters is initiated by the presence of small amounts of polyfunctional compounds containing active hydrogens which function as reaction centers or nuclei from which the branched chains emanate, the number of chains, as indicated, being equal to the functionality of the nucleus-forming compound. The preceding examples show the drop-wise addition of monoepoxide to the flask contents. It is understood, however, that other methods of preparing the polyesters of this invention can be used. Thus, while it is convenient to slowly add the monoepoxide, the three reactants can all be initially combined. In the case of an alcoholic hydroxyl initiator since the rate of reaction between this initiator and the monoepoxide is negligible compared to the reaction of alcoholic hydroxyls with anhydride, the reactions will proceed in the same order as those in the illustrative examples. In the case of a carboxyl or phenolic hydroxyl initiator the epoxide reacts first with the initiator to produce alcoholic hydroxyls which react with anhydride groups.

A feature of this invention is that it is theoretically possible to prepare hydroxyl, carboxyl, or hydroxyl-carboxyl terminated polyesters. Example 13 is illustrative of how, by using proper ratios of initiator to anhydride to monoepoxide a highly branched, high molecular weight polyester, whose branches terminate with carboxyl groups, can be prepared.

Another feature of the invention is that the saturated and unsaturated polyesters can be cured with aldehyde-amine or aldehyde-amide condensates such as urea-formaldehyde or melamine-aldehyde condensates (e.g., a fusible alkylated condensate of an aldehyde with urea or melamine) to give excellent film-forming compositions. In general, the branched polyester of this invention is reacted with about 30 to 70 percent by weight of aldehyde condensate, preferably with from 40 to 60 percent. This can best be illustrated by the following examples. The urea-formaldehyde resin used in the examples is a butyl- ated urea-formaldehyde resin having a non-volatile content of sixty percent in a solvent mixture of 87.5 percent butyl alcohol, and 12.5 percent xylene and a viscosity of U–X.

Example Y 10.0 grams of polyester of Example 2
16.7 grams of above butylated urea-formaldehyde resin at sixty percent solids
10.3 grams of toluene
3.0 grams of Cellosolve acetate The above materials are blended together by dissolving the polyester in the two solvents by the aid of heat and then adding the butylated urea-formaldehyde resin. This solution contains polyester and urea-formaldehyde resin solids in a 50–50 ratio. A three mil film of the above solution is deposited on a glass panel and baked 30 minutes at 150° C. The cured film is clear and extremely hard and mar-resistant. The film also has exceptionally good flexibility, toughness, and adhesion properties.

Example Z 10.0 grams of polyester of Example 3
16.7 grams of above butylated urea-formaldehyde resin at sixty percent solids
10.3 grams of toluene
3.0 grams of Cellosolve acetate The above materials are blended together by dissolving the polyester in the two solvents with the air of heat. The butylated urea-formaldehyde resin is then added. This solution contains polyester and urea-formaldehyde resin solids in a 50–50 ratio. A three mil film of the above blend is deposited on a glass panel and baked 30 minutes at 150° C. The resulting film has outstanding gloss, hardness, flexibility, mar-resistance, toughness, and adhesion properties.

As indicated hereinbefore, a feature fo this invention is that polyesters can be prepared having a multiplicity of unsaturated branch chains. For example, when an unsaturated anhydride is employed, for example, mixtures of maleic acid anhydride and phthalic acid anhydride, polyester branches joined to the initiator will contain recurring double bonds. This class of unsaturated polyesters is of particular importance because the polyesters can be cured with compounds such as styrene, yielding excellent compositions. A further feature is that following the teachings of this invention more highly branched chain polyesters are prepared than known heretofore. Methods for preparing polyesters having a large number of branch chains are not readily available. Particularly methods are not available whereby polyesters can be prepared having a predetermined number of branch chains and approximately predetermined molecular weights.

Because of the valuable properties possessed by esters prepared in accordance with this invention and because they can be varied widely in physical properties, the polyesters described herein are suitable for decorative, industrial and maintenance finishes, adhesives, cable and wire coatings, laminates, molded plastic articles and the like. Plasticizers, pigments, dyes, reinforcing agents, and similar materials commonly used in formulating polymeric compositions can be used with the polyesters of this invention. Since such variations will occur to those skilled in the art, it is obvious that these embodiments are within the scope of this invention.

We claim:
1. In the preparation of thermoplastic polyesters from dicarboxylic acid anhydrides and monoepoxides, the process for preparing branch chain polyesters having end groups which do not react with each other during preparation, comprising a compound which acts as a reaction initiator which is a monomer, a polymer or a copolymer having at least three functional constituents of the group consisting of carboxyl radicals, phenolic radicals or com- binations thereof, the number of such groups being equal to the number of branch chains desired, reacting the initiator, the anhydride and the monoepoxide by heating the reactants at an elevated temperature below 150° C. sufficient to bring about a reaction of the anhydride with the alcoholic hydroxyl group forming carboxyl groups, the reaction of monoepoxide with the phenolic hydroxyl groups to form alcoholic hydroxyl groups, as well as a reaction of monoepoxide with the carboxyl groups also forming alcoholic hydroxyl groups and maintaining the temperature below that at which a carboxy-hydroxy reaction takes place so that end groups of polyester chains growing by the successive addition of anhydride and monoepoxide to the initiator, do not react with each other and form water, said monoepoxide being free of substituents capable of reacting with an acid anhydride.

2. The process of claim 1 wherein the initiator is pyromellitic acid.

3. The process of claim 1 wherein the initiator is phloroglucinol.

4. The process of claim 1 wherein the initiator is a bisphenol terminated bisphenol-epichlorohydrin condensate made by reacting $n$ mols of epichlorohydrin with $n+1$ mols of bisphenol in the presence of $n$ mols of sodium hydroxide.

5. A monomer, polymer or copolymer containing at least three carboxyl or phenolic hydroxyl groups, or combinations thereof, in which at least three of the terminal hydrogen atoms of said groups are replaced by a radical having the following structural formulae:

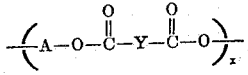

or

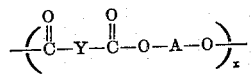

or combinations thereof,
where (a)

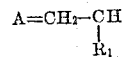

where $R_1$=H, an alkyl radical, an alkenyl radical,

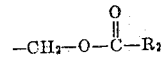

or —$CH_2$—O—$R_2$ where $R_2$=an alkyl, alkenyl or aryl radical,
(b) Y=nucleus of a dibasic acid anhydride and
(c) $x$=at least 1.

6. The product of claim 5 wherein the moiety having the three functional groups is a nucleus of pyromellitic acid.

7. The product of claim 5 wherein the moiety having the three functional groups is phloroglucinol.

8. The process of claim 1 wherein the dicarboxylic acid anhydride includes an anhydride of an unsaturated dibasic acid, and the monoepoxide is an alkylene oxide.

9. The process of claim 1 wherein the monoepoxide is propylene oxide and the anhydride is phthalic anhydride.

10. The process of claim 1 wherein the reaction of the initiator, monoepoxide and anhydride is carried out in the presence of a catalyst.

11. The process of claim 10 wherein the catalyst is a tertiary amine.

References Cited
UNITED STATES PATENTS 3,089,863   5/1963   Hicks et al. _____ 260—75

JOSEPH L. SCHOFER, *Primary Examiner.*

J. KIGHT, *Assistant Examiner.*